United States Patent
Barten

(10) Patent No.: US 6,186,520 B1
(45) Date of Patent: Feb. 13, 2001

(54) PORTABLE GOLF BAG CART

(76) Inventor: Arthur V. Barten, 2144 S. 1100 East, Suite 150, Salt Lake City, UT (US) 84106

(*) Notice: Under 35 U.S.C. 154(b), the term of this patent shall be extended for 0 days.

(21) Appl. No.: 09/194,527

(22) PCT Filed: May 29, 1997

(86) PCT No.: PCT/US97/09417

§ 371 Date: Nov. 25, 1998

§ 102(e) Date: Nov. 25, 1998

(87) PCT Pub. No.: WO97/45311

PCT Pub. Date: Dec. 4, 1997

(51) Int. Cl.[7] .................................................. B62B 1/04
(52) U.S. Cl. ................... 280/30; 280/DIG. 6; 280/47.18; 280/652
(58) Field of Search ................................ 280/DIG. 6, 30, 280/47.131, 47.15, 47.17, 47.18, 47.19, 47.23, 47.24, 47.26, 47.27, 652, 651, 654; 206/315.2, 315.3

(56) References Cited

U.S. PATENT DOCUMENTS

| | | | |
|---|---|---|---|
| 2,590,178 | * 3/1952 | Jamieson | 280/30 |
| 2,726,874 | * 12/1955 | Sullivan | 280/30 |
| 2,774,403 | 12/1956 | Williamson | 150/1.5 |
| 2,806,711 | * 9/1957 | Jacobs | 280/47.19 |
| 3,738,677 | * 6/1973 | Renock | 280/47.26 X |
| 3,985,373 | * 10/1976 | Widegren | 280/652 |
| 4,062,564 | 12/1977 | Schimmeyer | 280/652 |
| 4,282,912 | * 8/1981 | Brown . | |
| 4,792,152 | 12/1988 | Carolan | 280/47.26 |
| 5,112,068 | * 5/1992 | Liao et al. | 280/30 |
| 5,454,576 | 10/1995 | Pitkanen | 280/42 |
| 5,632,496 | * 5/1997 | Nelson | 280/30 |
| 5,967,543 | * 10/1999 | Taylor | 280/47.26 X |

* cited by examiner

Primary Examiner—Brian L. Johnson
Assistant Examiner—Bryan Fischmann
(74) Attorney, Agent, or Firm—Workman, Nydegger & Seeley

(57) ABSTRACT

A golf bag cart (10) characterized by a hinged canister (66) having an inner wall (84) defining an inner cavity (82) and a flange (78) extending radially inward from the inner wall (84). A golf bag (88) is received into the inner cavity (82) of the canister (66) and placed on the flange (78). The canister (66) is supported by a disassemblable or collapsible frame (12) on which is removably journaled on wheels (18) that allows the frame (12) to be moved when the wheels (19) roll. When a user wishes to have the golf bag cart (10) take up less room, the user can place the wheel (18) within the remaining space in the inner cavity (82) of the canister (66), and place the disassembled frame (12) into the golf bag (88).

22 Claims, 4 Drawing Sheets

PORTABLE GOLF BAG CART

BACKGROUND OF THE INVENTION

1. The Field of the Invention

The present invention relates to golf bag carts. More particularly, it relates to a lightweight golf bag cart that can be used with a conventional golf bag and that can be easily disassembled and stored.

2. The Relevant Technology

Although a golf bag is convenient for its short-range portability, it becomes quite cumbersome when used on the golf course, carrying it from green to green. In addition, the size and weight of golf bags has been increasing. As a result, golf bag carts are frequently used on the golf course where the golf bag is placed in or attached to the cart to permit wheeling about the golf course during the game. While present-day carts have eased the burden of carrying the golf bag, they have several disadvantages.

Most golf bag carts are separate pieces of equipment from the golf bag with which they may be used. Therefore, a golfer must transport both the golf bag and the golf bag cart separately or hope that he can rent a golf bag cart at the golf course. The inconvenience of having to carry and store a separate piece of equipment has limited the use of golf bag carts.

In addition, most golf bag carts are bulky and heavy, making them difficult to transport and to store along with equally bulky golf bags. Thus, transporting a golf bag cart from the house to the car and from the car to the golf course can be a difficult task, especially for those who may not have the physical strength necessary for such a task.

Furthermore, the wheels on golf bag carts can become caked with mud, dirt, or grass in the process of being used on a golf course. When a conventional golf bag cart with dirty wheels is transported or stored, dirty wheels can soil areas in a car or home. This is undesirable.

Moreover, many golf bag carts that have solved some of the problems above can only be used with golf bags especially designed for use with the specific cart. Thus, the purchase of a lightweight, transportable golf cart may require the purchase of a new golf bag as well. This can be expensive.

A further difficulty with some present-day disassemblable golf bag carts is that the detachable wheels, handles, etc. either require additional storage space or take up space that otherwise could be used for golf equipment.

Still a further difficulty with present-day disassemblable or collapsible golf bag carts is that the small size of the components necessary for portability has forced the distance between golf carts' wheels to be small, rendering the golf bag cart relatively unstable.

SUMMARY OF THE INVENTION

The invention relates to a golf bag cart comprising a plurality of wheels, a collapsible frame, an adjustable support means for supporting a conventional golf bag, a storage means for storing the wheels, an adjustable securing means for releasably securing the conventional golf bag to the collapsible frame, and a handle.

The golf bag cart has a fully assembled state and a disassembled state. In its fully assembled state, a conventional golf bag is attached to the golf bag cart to permit wheeling about a golf course during the game. In its fully assembled state, the golf bag cart has a proximal side and a distal side. The proximal side of the golf bag cart is that side which would be pulled by a user. The distal side of the golf bag cart is the opposite side. The golf bag cart also has a top and a bottom. The bottom of the golf bag cart is that side which is closest to the ground when the golf bag cart is being pulled along the ground. The top of the golf bag cart is the opposite side. In its disassembled state, the golf bag cart takes up less room than conventional golf bag carts.

The collapsible frame comprises an axle member, a horizontally disposed support means having a proximal end and a distal end, and a vertically disposed support means having a top end and a bottom end.

The collapsible frame has a fully assembled state and a disassembled state. In the collapsible frame's fully assembled state, the bottom end of the vertically disposed support means is attached to the axle member, and the vertically disposed support means extends substantially vertically from the axle member. The proximal end of the horizontally disposed support means is attached to the axle member, and the horizontally disposed support means extends substantially horizontally from the axle member. In the collapsible frame's disassembled state, the vertically disposed support means and the horizontally disposed means are disconnected from the axle member or are rotated so as to be disposed substantially parallel to the axle member.

In the golf bag cart's fully assembled state, the wheels are each releasably journaled on the axle member.

Furthermore, the distal end of the horizontally disposed support means is connected to the adjustable support means, so as to prevent the adjustable support means from moving vertically relative to the collapsible frame. The adjustable support means supports the bottom of the conventional golf bag and can be adjusted to accommodate conventional golf bags of varying diameters.

The top end of the vertically disposed support means is connected to the adjustable securing means, so as to prevent the adjustable securing means from moving relative to the collapsible frame. The adjustable securing means restrains any movement of the top of the conventional golf bag and can be adjusted to accommodate conventional golf bags of varying diameters.

The storage means is rigidly connected to the adjustable support means.

In the golf bag cart's disassembled state, the wheels are removed from the axle member and are placed within the storage means. The collapsible frame is put in its disassembled state and placed within the conventional golf bag as a conventional golf club. The adjustable support means and the adjustable securing means remain attached to the conventional golf bag.

BRIEF DESCRIPTION OF THE DRAWINGS

FIG. 1 is a perspective view of a preferred embodiment of the invention fully assembled and in use with a conventional golf bag.

FIG. 2 is a perspective, exploded view of the embodiment presented in FIG. 1, wherein the golf bag cart is fully assembled, but the conventional golf bag has been removed from the golf bag cart.

FIG. 3 is a perspective, exploded view of the embodiment presented in FIG. 1, wherein the golf bag cart is in a disassembled state, but a collapsible frame remains in its fully assembled state. An adjustable support means in the form of a hinged canister is attached to the bottom of the conventional golf bag, and an adjustable securing means in the form of an adjustable retaining strip remains encircled around the top of the conventional golf bag. In addition, a set of wheels has been removed from the axle member of the collapsible frame.

FIG. 4 is a perspective view of the embodiment presented in FIG. 1, wherein the collapsible frame has been disassembled and then placed inside the golf bag, just as a golf club. The detachable wheels (not shown) have been stowed inside the hinged canister between the bottom of the hinged canister and the bottom of the golf bag. Both the hinged canister and retaining strip remain attached to the golf bag.

DETAILED DESCRIPTION OF A PREFERRED EMBODIMENT

Figure 1:
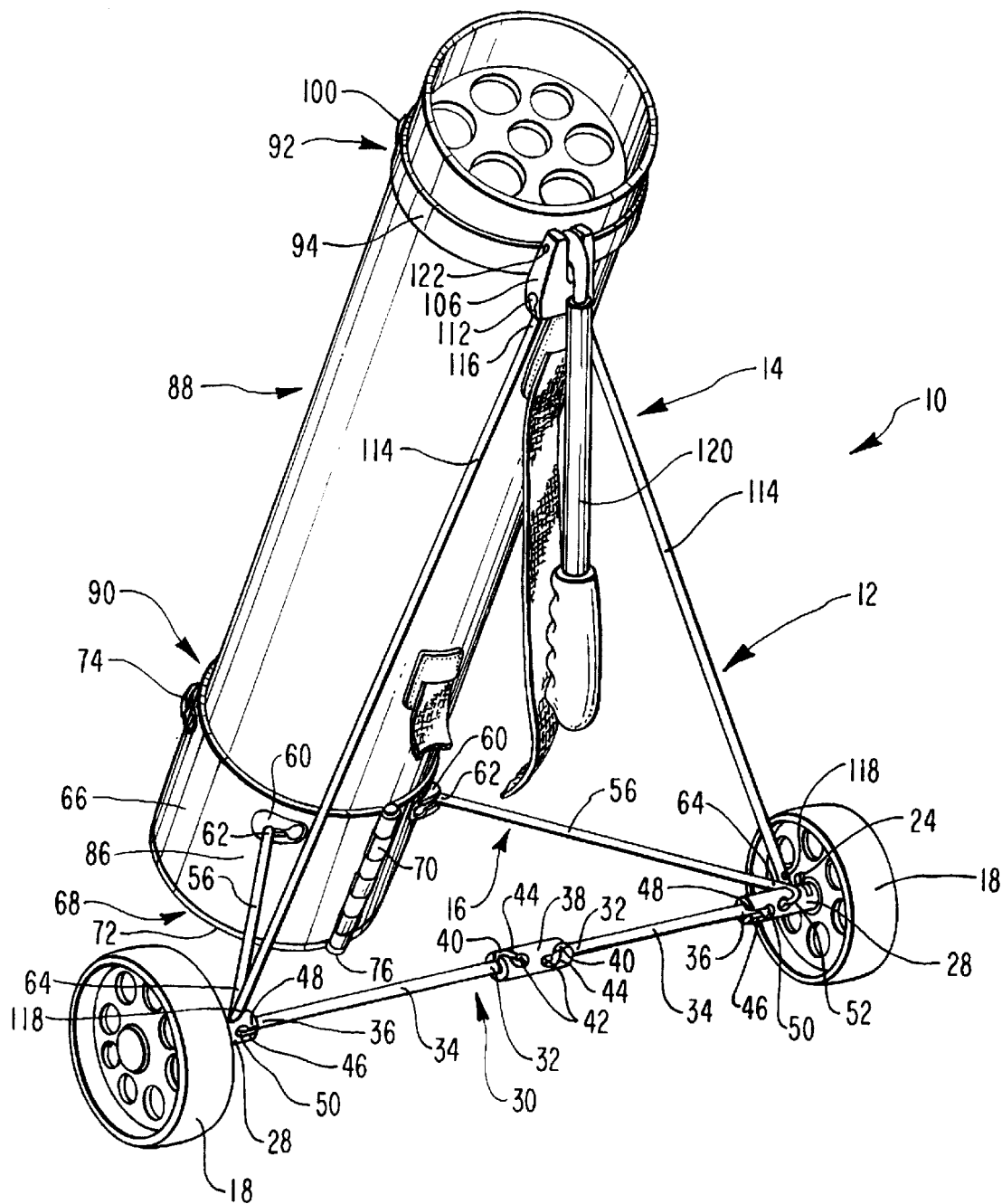
FIGS. 1 through 4 present illustrations a preferred embodiment of the invention wherein like reference numerals refer to like components.
Figure 2:
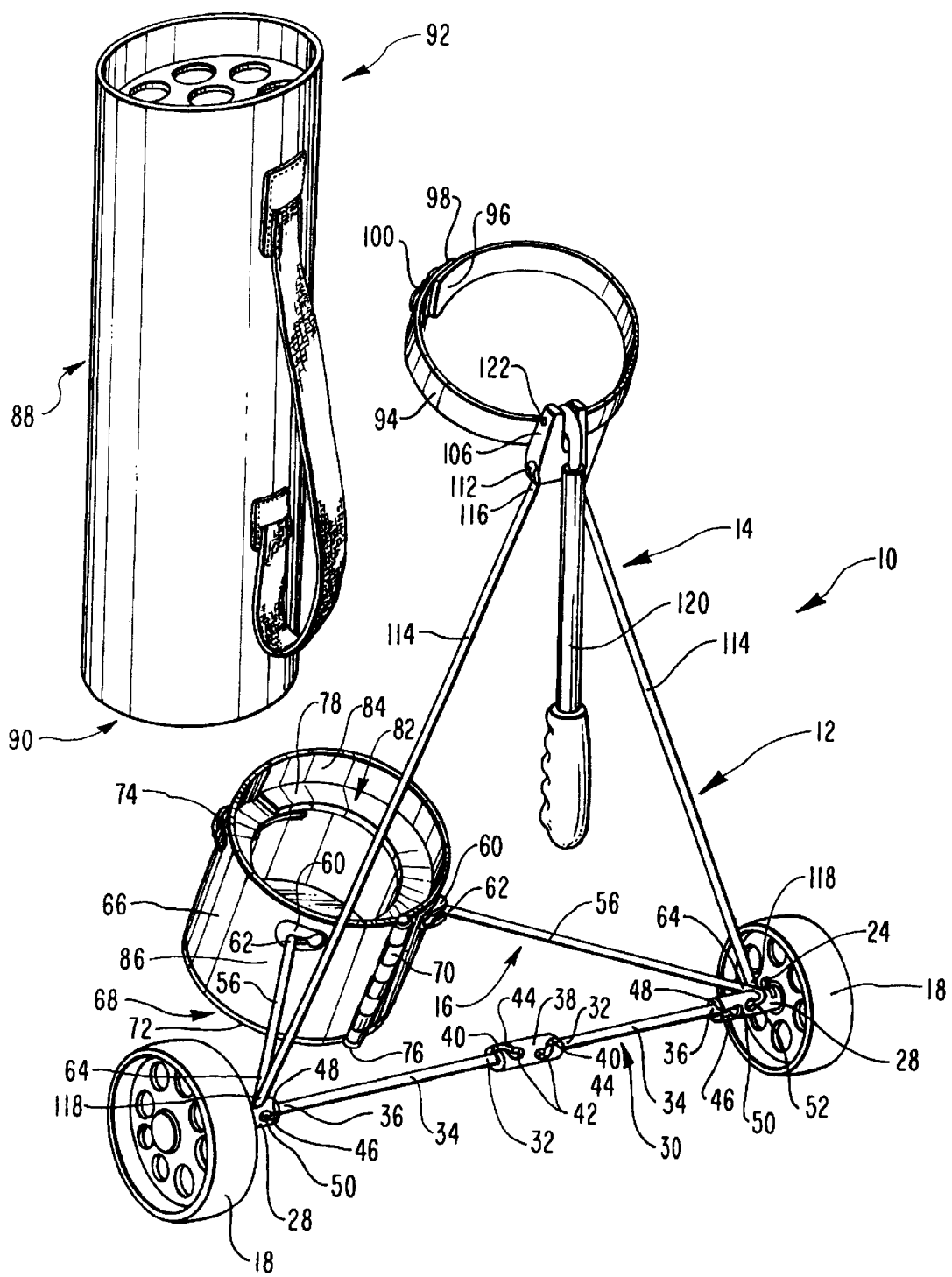

FIGS. 1 through 4 present a preferred embodiment of the invention, and are not meant to limit the disclosure to the wide variety of embodiments that may be constructed. FIGS. 1 and 2 show a preferred embodiment of a golf bag cart 10 in its fully assembled state. Golf bag cart 10 comprises two wheels 18,18; a collapsible frame 12; an adjustable support means for supporting a conventional golf bag 88, and a storage means for storing wheels 18,18, both embodied in a hinged canister 66; an adjustable securing means in the form of a retaining strap 94 for securing a top portion 92 of conventional golf bag 88; and a handle 120.

Collapsible frame 12 is comprised of a horizontally disposed support means 16, and a vertically disposed support means 14, and an axle member 30. As seen particularly well in FIG. 3, horizontally disposed support means 16 is embodied by two horizontally disposed support members 56,56, each having a distal ball-shaped end 62 and a proximal ball-shaped end 64. Proximal ball-shaped ends 64,64 are shaped substantially the same as distal ball-shaped ends 62,62, shown in FIG. 3. Vertically disposed support means 14 comprises two vertically disposed support members 114,114, each having a top ball-shaped end 116 and a bottom ball-shaped end 118. Top ball-shaped ends 116,116 and bottom ball-shaped ends 118,118 are shaped substantially the same as distal ball-shaped ends 62,62, shown in FIG. 3.

Axle member 30 comprises a two-way socket-and-groove connector 38 and two short axle members 34,34. Each short axle member 34 has an outside ball-shaped end 36 and an inside ball-shaped end 32. Outside ball-shaped ends 36,36 and inside ball-shaped ends 32,32 are shaped substantially the same as distal ball-shaped ends 62,62 of horizontally disposed support members 56,56, shown in FIG. 3. Inside ball-shaped ends 32,32 of short axle members 34,34 are connected by means of two-way socket-and-groove connector 38. Two-way socket-and-groove connector 38 comprises two socket-and-grooves 44,44, which in turn comprise grooves 40,40 each of which have a substantially circular cross-section and which enlarge to terminate in a spherical socket 42. To connect two-way socket-and-groove connector 38 to short axle members 34,34, inside ball-shaped ends 32,32 are inserted into sockets 42,42 and then slid along grooves 40,40. This connection prevents short axle members 34,34 from translating axially with respect to each other and with respect to two-way socket-and-groove connector 38. The use of two-way socket-and-groove connector 38 allows axle members 34,34 to be short enough to be portable and yet, when placed end-to-end, long enough to provide a wide wheel base for golf bag cart 10, thereby making golf bag cart 10 more stable.

Figure 3:
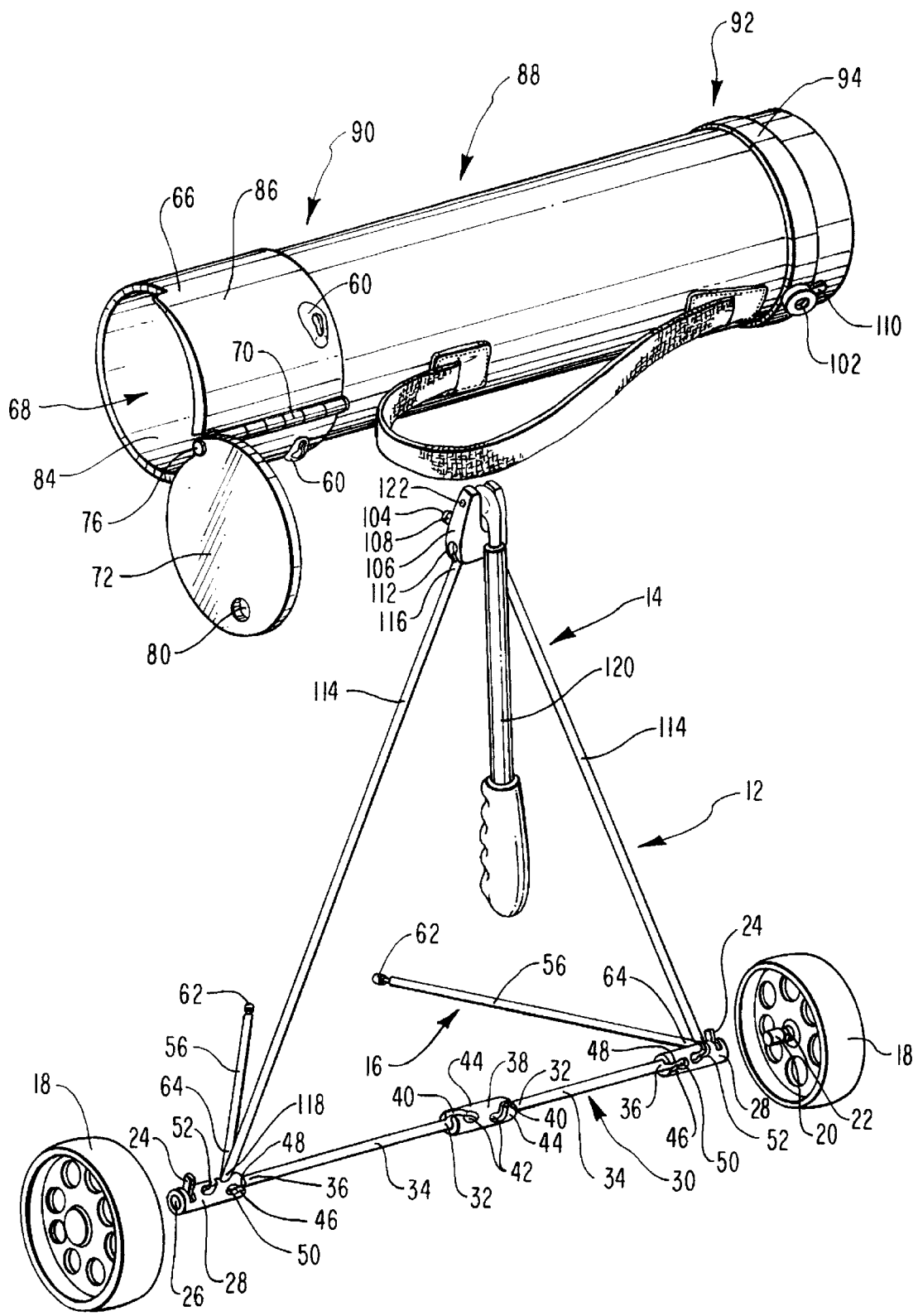
Figure 4:
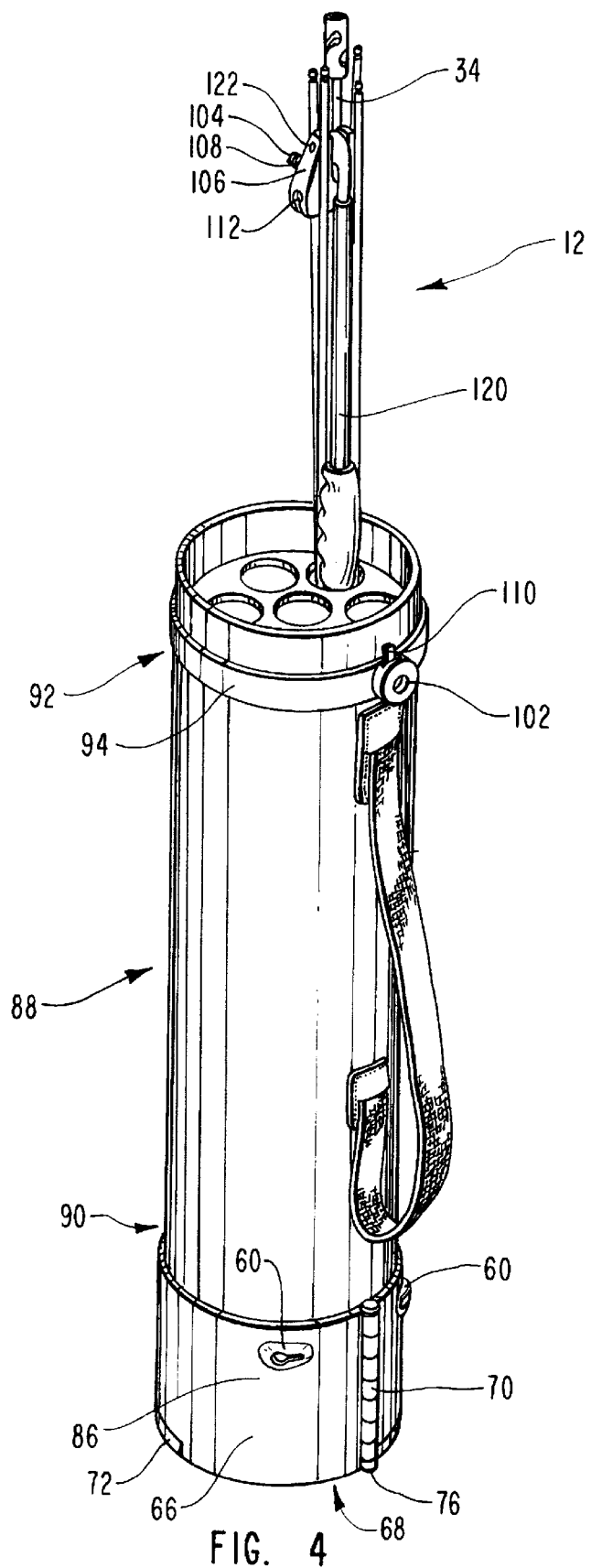

Golf bag cart 10 can be wheeled along the ground by means of wheels 18,18, each of which comprises a wheel axle 20 and a groove 22. As can be seen in FIG. 3, to attach one of the wheels 18,18 onto collapsible frame 12, wheel axle 20 is inserted into a cavity 26 formed in the outside end of a three-way socket-and-groove connector 28. Wheel axle 20 can rotate freely inside cavity 26, but a spring-loaded pin 24 engages groove 22 in wheel axle 20 to prevent wheel 18 from translating axially with respect to three-way socket-and-groove connector 28.

Each three-way socket-and-groove connector 28 also has three socket-and-grooves 46, 52, 54. Each of socket-and-grooves 46,46 receive the outer ball-shaped end 36 of one of short axle members 34,34. Socket-and-groove 46 comprises a groove 48 formed in three-way socket-and-groove connector 28 which has a substantially circular cross-section and which enlarges to terminate in a spherical socket 50. When ball-shaped outer end 36 of short axle member 34 is placed into socket 50 and is slid into groove 48, short axle member 34 is prevented from translating axially with respect to three-way socket-and-groove connector 28.

Each three-way socket-and-groove connector 28 also has a socket-and-groove 52 which receives ball-shaped proximal end 64 of horizontally disposed support member 56 in the same way as socket-and-groove 46 receives ball-shaped outer end 36, preventing ball-shaped proximal end 64 of horizontally disposed support member 56 from translating vertically with respect to three-way socket-and-groove connector 28.

Ball-shaped distal ends 62,62 of horizontally disposed support members 56,56 are received by one-way socket-and-groove connectors 60,60 which, in turn, are rigidly fixed to an outer wall 86 of hinged canister 66. Hinged canister 66 comprises two semicylindrical halves joined at one seam by a hinge 70 and at the other seam by a clamping lock 74. Within hinged canister 66 and extending radially inward from an inner wall 84 of hinged canister 66 is a flange 78. A cavity 82 formed within inner wall 84 and above flange 78 receives a bottom portion 90 of conventional golf bag 88. Bottom portion 90 of conventional golf bag 88 rests on and is supported by flange 78. Clamping lock 74 can be adjusted so as to decrease the diameter of hinged canister 66, thereby snugly securing bottom portion 90 of conventional golf bag 88 within hinged canister 66. A bottom 68 of hinged canister 66 is also fitted with an access plate 72, which is rotatably mounted at one edge of access plate 72 to hinged canister 66 by means of a pin 76 used in hinge 70. Thus, access plate 72 can rotate about pin 76, and in doing so, access plate 72 selectively exposes or covers bottom 68 of hinged canister 66. A hole 80 is formed within access plate 72 to allow for easy grasping of access plate 72.

Top portion 92 of conventional golf bag 88 is secured to collapsible frame 12 by means of retaining strap 94. Retaining strap 94 comprises a single piece of suitable material encircled about top portion 92 of conventional golf bag 88 and overlapping itself at a first end 96 and a second end 98. First end 96 and second end 98 of retaining strap 94 are clamped together by a clamping lock 100, which permits the diameter of retaining strap 94 to be adjusted so as to snugly fit around top portion 92 of conventional golf bag 88.

Retaining strap 94 is attached to collapsible frame 12 by means of a female connector 102 rigidly attached to retaining strap 94. Female connector 102 receives a male connector 104 which protrudes from the distal side of an apex connector 106. Male connector 104 is formed with a groove 108 so that when male connector 104 is inserted into female connector 102, a spring-loaded pin 110 engages groove 108, preventing male connector 104 from translating with respect to female connector 102. Apex connector 106 further comprises socket-and-grooves 112,112 formed within apex connector 106. Socket-and-grooves 112,112 receive ball-shaped top ends 116,116 of vertically disposed support members 114,114. Ball-shaped bottom ends 118,118 of vertically disposed support members 114,114 are received by socket-and-grooves 54,54 which are not shown but which are substantially the same as socket-and-grooves 46,52.

Thus, vertically disposed support members 114,114 in connection with short axle members 34,34 form what is substantially an isosceles triangle, which acts to support top portion 92 of conventional golf bag 88 by means of retaining strip 94. Similarly, horizontally disposed support members 56,56 in connection with short axle members 34,34 also form what is substantially an isosceles triangle, which acts to support bottom portion 90 of conventional golf bag 88 by means of hinged canister 66. Together, horizontally disposed support members 56,56; short axle members 34,34; vertically disposed support members 114,114; and their connecting means (three-way socket-and-groove connectors 28,28; two-way socket-and-groove connector 38, and apex connector 106) form collapsible frame 12.

In addition, apex connector 106 is fitted with handle 120, which is capable of being rotated in a substantially vertical plane by means of a pin joint 122 between apex connector 106 and handle 120. Pin joint 122 not only allows handle 120 to be rotated in a substantially vertical plane but also to be selectively fixed at any angular position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cart comprising:
   a frame having a length and a plurality of rearrangeable components;
   at least one wheel removably journaled on said frame so as to allow said frame to be transported by rolling said at least one wheel, said frame including an axle and being attached to a rigid extension member; and
   a canister attached to said frame and said rigid extension member, said canister comprising:
   an inner cavity of sufficient size and configuration to receive a semi-rigid container extending substantially the length of said frame and to store substantially within said inner cavity said at least one wheel when removed from said frame,
   a container retaining means for releasably retaining said container when said container is received within said inner cavity, and
   a wheel retaining means for releasably retaining said at least one wheel when said at least one wheel is removed from said frame and is stored substantially within said inner cavity.

2. A cart as recited in claim 1, wherein said canister comprises two hinged substantially semicylindrical halves.

3. A cart as recited in claim 1, wherein said canister further comprises an inner wall, and said container retaining means comprises a flange extending radially inward from said inner wall.

4. A cart as recited in claim 1, wherein said wheel retaining means comprises a selectively removable access plate.

5. A cart as recited in claim 1, wherein said canister comprises opposing concave inner walls having a distance between said walls, the distance between said walls being adjustable.

6. A cart as recited in claim 2, wherein said canister further comprises an inner wall and said container retaining means comprises a flange extending radially inward from said inner wall.

7. A cart as recited in claim 2, wherein said wheel retaining means comprises a selectively removable access plate.

8. A cart as recited in claim 4, wherein said access plate is rotatably mounted to said canister.

9. A cart as recited in claim 6, wherein said wheel retaining means comprises a selectively removable access plate.

10. A cart as recited in claim 9, wherein said access plate is rotatably mounted to said canister.

11. A golf bag cart comprising:
    (a) a releasable support means for supporting a golf bag;
    (b) a frame attached to a rigid extension member and releasably attached to the adjustable support means, the frame comprising:
       (1) a means for supporting the adjustable support means; and
       (2) an axle member releasably attached to the means for supporting the adjustable support means;
    (c) a releasable securing means attached to the frame for releasably securing the golf bag to the frame; and
    (d) a storage means for storing a wheel, the storage means being attached to said rigid extension member and releasably attached to the frame, and the wheel being releasably journaled on the axle member of the frame.

12. A golf bag cart as recited in claim 11, wherein said releasable support means comprises a hinged canister having opposing concave inner walls having a distance between said inner walls.

13. A golf bag cart as recited in claim 11, wherein the golf bag cart can be disassembled by removing the wheel from the axle member of the frame and placing it within the storage means, by removing the frame from the releasable support means and from the releasable securing means, by disconnecting the axle member from the support means for supporting the releasable support means, and by placing the support means for supporting the releasable support means and the axle member within the golf bag.

14. A golf bag cart as recited in claim 11, wherein said releasable securing means comprises a retaining strap.

15. A golf bag cart as recited in claim 12, wherein said releasable support means further comprises a flange extending radially inward from said inner walls.

16. A golf bag cart as recited in claim 11, wherein both said releasable support means and said storage means comprise a hinged canister.

17. A golf bag cart, comprising:
    (a) a collapsible frame, the collapsible frame comprising:
       (1) an axle member;
       (2) a plurality of first support members, each first support member having a top end and a bottom end, the bottom end of each first support member being releasably attached to the axle member and the top end of each first support member being releasably attached to one another; and (3) a plurality of second support members, each second support member having a proximal end and a distal end, the proximal end of each second support member being releasably attached to the axle member;

(b) a plurality of wheels, each removably journaled on the axle member of the collapsible frame;

(c) a hinged canister releasably attached to the distal end of each second support member of the collapsible frame, said hinged canister having a first and second end separated by an inner cavity, said first end having an adjustable opening, said adjustable opening being adjustable for receiving a golf bag into said inner cavity and said second end having an opening, said opening being removably covered by an access plate and being configured for receiving said plurality of wheels for storage in said inner cavity when said plurality of wheels is removed from said axle member;

(d) a retaining strap releasably attached to the top end of each first support member of the collapsible frame and being releasable for securing said golf bag to said collapsible frame.

18. A golf bag cart as recited in claim 17 further comprising a handle mounted on the collapsible frame for a user to control movement of said collapsible frame on said plurality of wheels.

19. A golf bag cart as recited in claim 18, said handle having a position relative to said collapsible frame that is adjustable.

20. A golf pull cart comprising:

a frame having a handle end and an opposite axle end;

a pair of wheels removably journaled at opposite ends of the axle end of the frame;

a rigid extension member having opposite first and second ends, the first end being attached to the axle end of the frame;

a canister attached to the second end of the rigid extension member and having:
    a golf club bag compartment for releasable retaining therein one end of a golf club bag that extends out of the first compartment towards the handle end of the frame; and
    a wheel storage compartment, situated below the golf club bag compartment, for storing therein said pair of wheels when removed from the axle end of the frame.

21. A cart as recited in claim 20, wherein said frame comprises a plurality of rearrangeable components.

22. The golf pull cart as defined in claim 20 further comprising a handle member, attached to and extending from the handle end of the frame, whereby a golfer can pull or push the golf pull cart by the handle member to transport the golf pull cart by rolling the pair of wheels over land.

* * * * *